United States Patent [19]

Oba et al.

[11] Patent Number: 4,658,882
[45] Date of Patent: Apr. 21, 1987

[54] MACHINE FOR DIRECT ROLLING OF STEEL CASTING AND PRODUCING STEEL PRODUCT THEREFROM

[75] Inventors: Hanji Oba; Koji Hyodo; Michiyasu Honda; Kazuhide Kameyama, all of Sakai, Japan

[73] Assignee: Nippon Steel Corporation, Tokyo, Japan

[21] Appl. No.: 757,910

[22] Filed: Jul. 22, 1985

Related U.S. Application Data

[63] Continuation of Ser. No. 567,149, Jan. 3, 1984, abandoned, which is a continuation of Ser. No. 341,343, Jan. 21, 1982, abandoned.

[30] Foreign Application Priority Data

Jan. 22, 1981 [JP] Japan ................... 56-8397

[51] Int. Cl.⁴ .................. B22D 11/124; B22D 11/12
[52] U.S. Cl. ..................... 164/417; 164/444; 164/414
[58] Field of Search ............... 164/486, 455, 444, 417, 164/414, 476

[56] References Cited

U.S. PATENT DOCUMENTS

| | | | |
|---|---|---|---|
| 2,791,812 | 5/1957 | Dangelzer et al. | 164/444 |
| 3,331,123 | 7/1967 | Cofer | 164/476 X |
| 3,414,043 | 12/1968 | Wagner | 164/486 X |
| 3,771,584 | 11/1973 | Wojcik | 164/486 X |
| 4,009,750 | 3/1977 | Fekete et al. | 164/414 |
| 4,019,560 | 4/1977 | Gruner et al. | 164/486 |
| 4,036,281 | 7/1977 | Rossi | 164/486 |
| 4,211,272 | 7/1980 | Schrewe et al. | 164/444 X |
| 4,261,552 | 4/1981 | Kameyama et al. | 164/263 X |

FOREIGN PATENT DOCUMENTS

| | | | |
|---|---|---|---|
| 2042546 | 3/1972 | Fed. Rep. of Germany | 164/444 |
| 45-415 | 1/1970 | Japan | 72/202 |
| 52-89550 | 7/1977 | Japan . | |
| 55-97267 | 7/1980 | Japan . | |
| 510312 | 4/1976 | U.S.S.R. | 164/444 |
| 261660 | 12/1977 | U.S.S.R. | 164/444 |

OTHER PUBLICATIONS

Handbook on Continuous Casting, Herrmann, 1958, pp. 268–269, 450–451, 630, 688–689.
Abstract #745—Handbook on Continuous Casting, Herrmann, 1980.

*Primary Examiner*—Kuang Y. Lin
*Attorney, Agent, or Firm*—Wenderoth, Lind & Ponack

[57] ABSTRACT

Machine for direct rolling of a steel casting from the continuous casting process and producing a steel product therefrom characterized in that the continuous casting machine is provided with an air-water mist cooling means having a selective cooling function and a heat-retention means, and a quick heating means for the edge portions of the steel casting if necessary, and a scale breaker are installed at the inlet of a rough rolling stand, whereby direct rolling without further surface treatment of the steel casting is made feasible.

6 Claims, 12 Drawing Figures

MACHINE FOR DIRECT ROLLING OF STEEL CASTING AND PRODUCING STEEL PRODUCT THEREFROM

BACKGROUND OF THE INVENTION

This application is a continuation of now abandoned application Ser. No. 567,149, filed Jan. 3, 1984, which in turn is a continuation of now abandoned application Ser. No. 341,343, filed Jan. 21, 1982.

1. Field of the Invention

The present invention relates to a machine for direct rolling of a steel casting and producing a steel product therefrom, and more particularly, to a machine for direct rolling of a hot steel casting emerging from a continuous casting machine without further surface treatment and producing the steel product therefrom.

2. Description of the Prior Art

In the field of a continuous casting machines, with a view to attaining energy-saving and high productivity, there has quite recently been developed and used on an industrial scale a machine wherein the hot steel casting emerging from a continuous casting machine is delivered directly to a rolling line for hot rolling.

In order to make the present invention easier to understand, the above described machine will be explained hereinbelow.

FIG. 1 of the accompanying drawings is an overall view showing the whole direct rolling and producing system wherein a continuous casting machine 1, a continuous casting mold 2, and withdrawal guide rolls 3 are shown. A steel casting 4 withdrawn from the mold 2 is cooled to its core to effect complete solidification thereof by the time it arrives at the end of the machine. Moreover, the continuous casting machine 1 is provided with a slow cooling means 5 and a heat-retention means 6 so as to prevent it from cooling excessively.

The slow cooling means 5 comprises a group 5a of air-water mist cooling means (referred to as "air-water cooling means" hereinafter) which spray an air-water mixture of compressed air mixed with cooling water onto the steel casting 4, and a group 5b of external roll cooling means which spray an air-water mixture onto the withdrawal guide rolls in order to cool the casting 4 indirectly. In the slow cooling apparatus 5 of the system, the steel casting 4 is uniformly cooled in its cross sectional direction because it is uniformly subjected to the air-water mist spray (referred to as "air-water spray" hereinafter). And, when the solidification of the casting 4 reaches a specified degree, it is then indirectly cooled by the withdrawal guide rolls 3 to retain the high heat content of the casting 4. It has been confirmed that the air-water cooling arrangement is highly advantageous since the cooling capacity can be easily controlled, uniform cooling can be obtained in the cross sectional direction of the casting, and the cooling process can be accomplished with a small temperature gradient.

As for the quality of the steel plate thus manufactured, however, it has been found that the quality of the steel product is not always sufficiently high, especially where there is required a steel plate of superior quality, for instance a hot rolled steel plate for use in production of tinplate, because the temperature at the trailing end of the casting becomes relatively low. This is the first problem to be solved.

Now the heat-retention means will be explained. The heat-retention means 6 mentioned hereinbefore is installed at an arbitrary position on the outlet side of the continuous casting machine 1.

FIG. 2 is a perspective view showing an embodiment of the heat-retention means 6 comprising a heat-retention plate 6a lined with a heat insulating material 7 which covers one edge of the steel casting 4, and a support means 6b which supports the heat-retention plate 6a in such manner that the plate 6a is able to move transversely (in the width direction of the casting). As shown in the partial sectional view of FIG. 3, the gap t between the heat-retention means and the edge face 4a of the casting is reduced as much as possible via a contact boss 6c. An eave-like heat-retention plate 6d which protrudes over the side of the casting and a concave member 6e which corresponds in shape with the circumference of a corresponding one the withdrawal guide rolls 3 are also shown. In the above-described continuous casting machine, the withdrawal guide rolls 3 are arranged at a short pitch or interval, and the casting 4 is slowly cooled, hence the temperature drop at the center of the casting is very small, but the temperature drop at the edges of the casting is remarkable. Both the temperature drop in the cross sectional direction of the casting 4 and the overall temperature drop can be greatly reduced by covering the edge of the casting with the heat-retention means 6.

In FIG. 1, there is also shown a gas cutting means 8 which cuts the casting 4 into specified lengths for the subsequent rolling step. A casting heat-retention cover 9 (referred to as a "cover" hereinafter) is installed before and after the gas cutting means 8. As shown in detail in FIGS. 4–5, the cover 9 has a trough-like cross sectional shape which covers the transport path of the casting 4 and the cover 9 is engaged with the gas cutting means 8 via a metal connector 10 in such manner that the cover 9 advances and retreats simultaneously with the gas cutting operation.

In addition, it is effective to make the length of the front cover 9a larger than the cut length of the casting 4 while making that of the rear cover 9b larger than the distance of movement of the gas cutting means 8 because with this arrangement the cover combined with a top heat insulating hood 11 described hereinafter is always able to cover the casting 4 being cut. The top heat insulating hood 11 is installed on a transport table 12 on which the casting 4 delivered from the continuous casting machine 1 and a length of casting 40 cut by the gas cutting means 8 are transported. It is seen that the casting 4 being cut will always be covered by the cover 9 of the above length, which is made to accommodate the top heat insulating hood 11 as shown in FIG. 5. The length of casting 40 cut by the gas cutting means 8 is immediately received by the transport table 12 on which transport rolls 13 are arranged in the transport direction, and then delivered by the transport table 12 to a hot rolling stand 14.

FIGS. 6–7 show an arrangement designed to keep the casting warm on the transport table 12. Where, the top heat insulating hood 11, trough-like in cross section, is detachably mounted on the transport table 12 along the transport path of the casting. Besides, heat insulating boards 15 are detachably mounted between adjacent transport rolls 13 to close the space between the rolls. It is preferred that the heat insulating boards 15 be mounted along the front and rear portion of movement of the gas cutting means 8. Particularly, a heat insulating board 15a (FIG. 5) which coincides with the range of movement of a cutting torch 8a can be mounted to be opened and closed by a cylinder means 16 as shown in FIG. 5. This is effective because the cut chip can be removed efficiently.

In the machine described in the foregoing, scarfing of the casting is no longer required, with the result that a very high energy-saving effect is attained and a steel product of superior quality can be manufactured with high productivity. However, a second problem caused by the temperature drop of the casting has become apparent namely the temperature drop at various portions of the casting, such as at the end portion of the hot casting which has been cut by gas, particularly at front and rear end faces of the cut section in the width direction. These temperature drops are brought about by various causes such as changes in casting requirements, changes in the width of the castings, reduction in the casting speed when the molten steel tundish or ladle is changed, and changes in the casting speed at the time its speed must be controlled because of trouble in a later processing operation, etc. Thus, direct rolling is made impossible due to such temperature drops. Accordingly, improvement of the heating means is required to make possible the direct rolling of a casting obtained from the continuous casting process.

SUMMARY OF THE INVENTION

It is a principal object of the present invention to provide a slow cooling means for a continuous casting machine which supplies a casting directly to a rolling machine for rolling the continuous casting and which cooling means is able to prevent surface defects from occurring in the casting while it is in a hot state.

It is another object of the invention to provide a slow cooling means for a continuous casting machine which can produce a casting which can be directly rolled while it is in a hot state after being subjected to selective slow cooling.

It is still another object of the invention to provide a slow cooling means for a continuous casting machine for supplying a casting directly to a rolling machine for rolling the continuous casting while it is in a hot state after passing through a heat-retention means which keeps the temperature of the casting high.

BRIEF DESCRIPTION OF THE DRAWINGS

Other and further objects of the invention will be better understood from the following detailed description with reference to the accompanying drawings, in which.

DETAILED DESCRIPTION OF THE INVENTION

The present invention relates to a slow cooling apparatus for a a curved continuous casting machine and a hot rolling machine. The curved continuous casting machine is provided with a spray cooling means immediately below the continuous casting mold, a slow cooling means following the spray cooling means and consisting of an air-water mist cooling means capable of selectively cooling parts of the casting emerging from the mold, a heat-retention means which keeps the casting at a specified average temperature after the cooling zone and which closes the gaps between transport rolls, and a gas cutting means provided with a heat-retention cover which cuts the casting into specified lengths suitable for a subsequent hot rolling. Through the provision of these means the curved continuous casting means is capable of providing the subsequent processing step with a hot casting with very little temperature deviation. In the subsequent hot rolling machine, the hot casting is, if required passed through a quick heating means, transported by a transport table and immediately subjected to hot rolling. Thus, the present invention makes it possible to carry out direct rolling of a casting from a continuous steel casting which requires no surface conditioning aside from scale breaking prior to hot rolling, and more particularly relate to a machine which, aside from being equipped with a scale breaker, need not be equipped with a hot scarfing or any other surface conditioning means for the hot casting prior to the hot rolling machine.

Thus, the inventors of the invention have overcome the above-described problem primarily by providing a slow cooling means, more particularly air-water mist cooling means additionally provided with a selective cooling function, and also by providing a quick heating means for the edge portions of the steel casting, for instance an induction heating means or a gas heating means, between the continuous casting machine and the hot rolling machine. If the steel casting can be maintained at the target temperature, even without the induction or gas heating means, there is of course no need to provide such means.

The slow cooling means in accordance with the invention is explained in detail with reference to the drawings.

Figure 1:
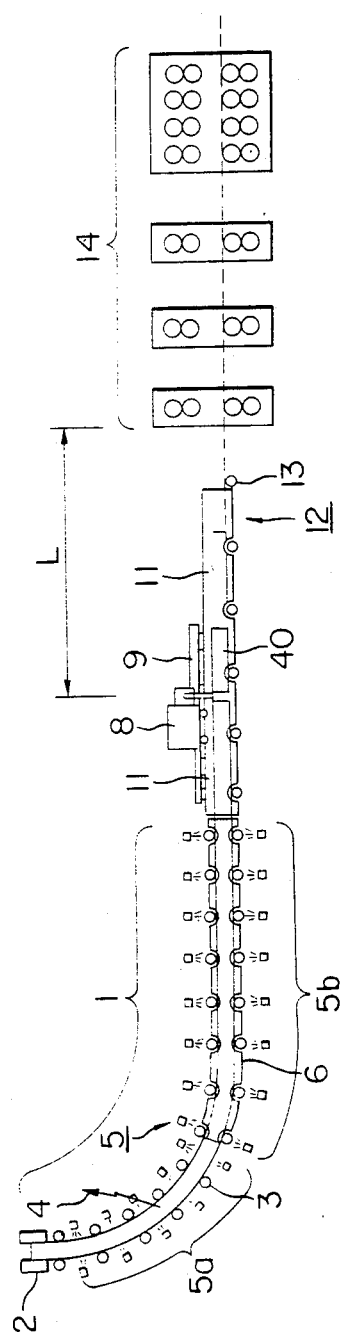
FIG. 1 is an explanatory view schematically showing the whole continuous casting and direct rolling system to which this invention is applicable.
Figure 2:
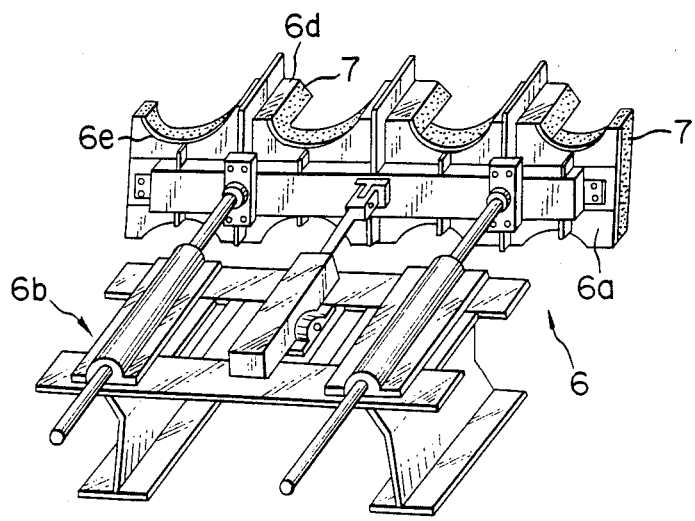
FIG. 2 is a perspective view showing an embodiment of a heat-retention means of the continuous casting system.
Figure 3:
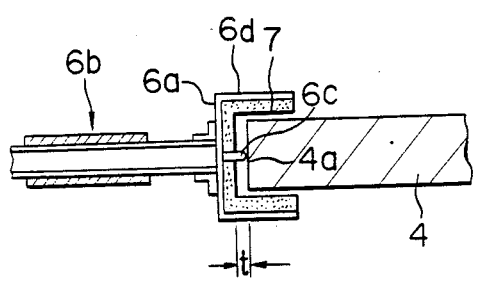
FIG. 3 is a partial sectional view of FIG. 2.
Figure 4:
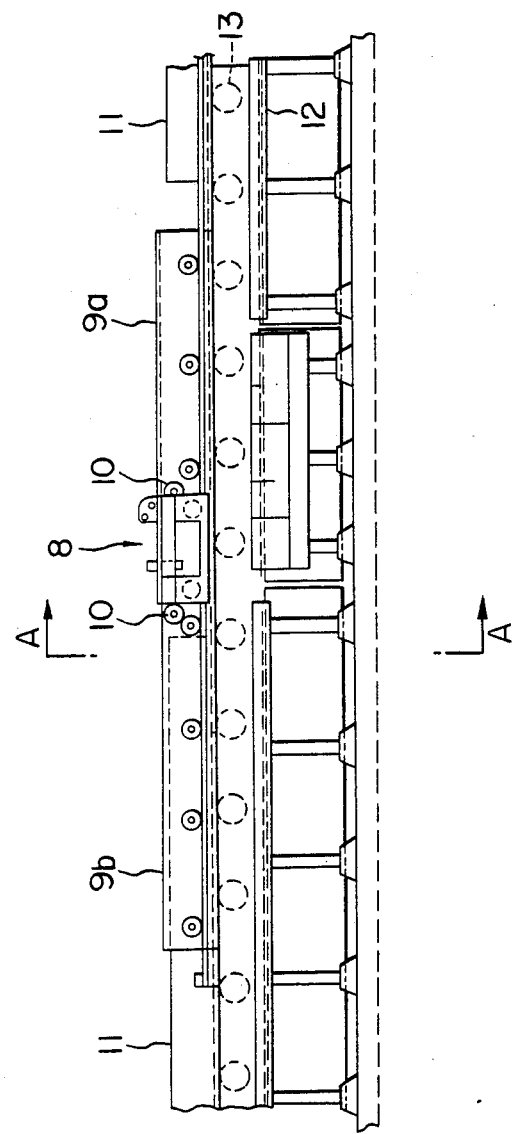
FIG. 4 is a side view showing a gas cutting means.
Figure 5:
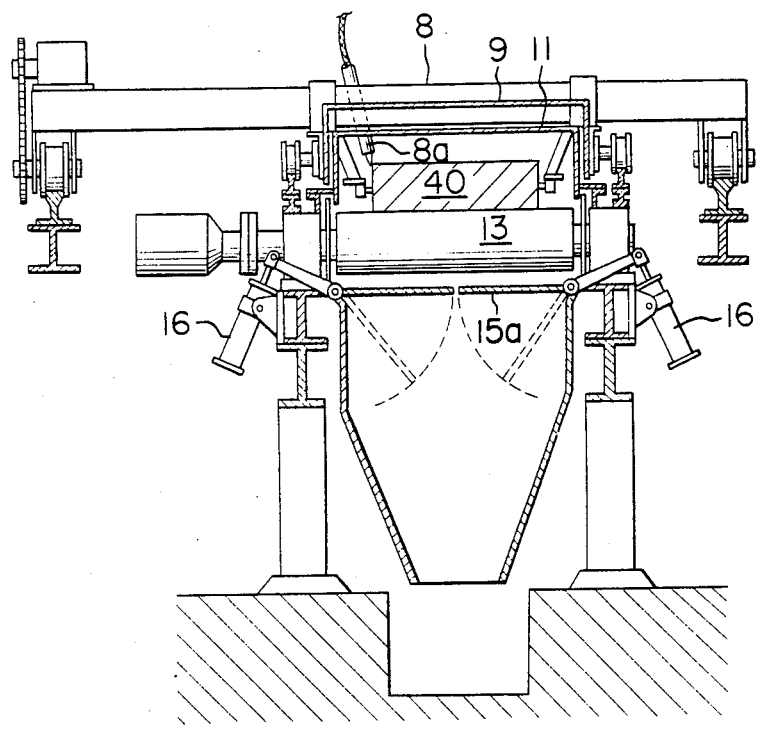
FIG. 5 is a sectional view along the line A—A of FIG. 4.
Figure 6:
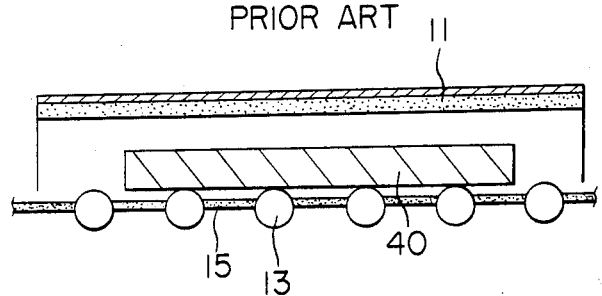
FIGS. 6–7 are longitudinal and horizontal sectional views showing a heat retention means for retaining the heat of a casting.
Figure 7:
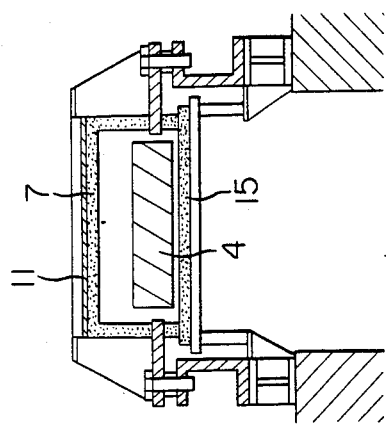
Figure 8:
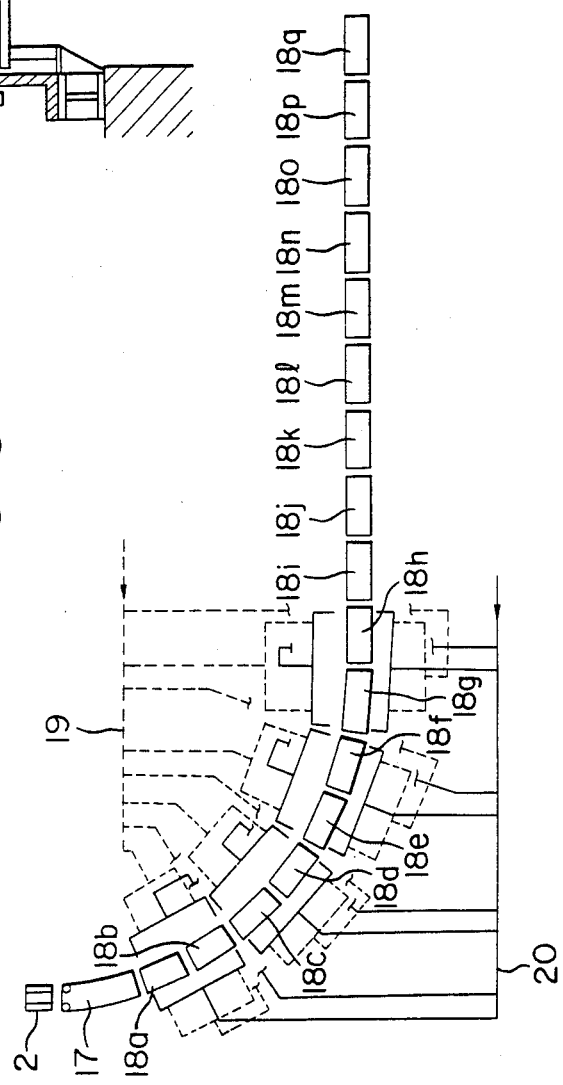
FIG. 8 is an explanatory view schematically showing the construction of a slow cooling means according to this invention.

In the schematic view of the slow cooling means shown in FIG. 8, a steel casting from a mold 2 is quickly cooled in a spray cooling means 17 provided with a large number of nozzles. By this cooling, the casting forms a solidified shell. This construction is well-known in the field of curved continuous casting machines having a number of apron rollers installed en bloc on a frame. When a breakout or some other problem occurs, it is usual to change all the rollers en bloc. This construction gives excellent operating efficiency and is also used in the present invention.

As the continuous steel casting which has passed through the spray cooling means 17 still has an unsolidified core, it is thereafter passed through a series of segments 18a–18h forming the curved part of the casting machine and each provided with an air-water mist cooling means. Each of the segments 18a–18h comprises a frame having five or six upper casting rolls and an equal number of lower casting rolls rotatably mounted thereon. The term "casting roll" as used herein includes guide rolls, pinch rolls, leveling rolls, and compressing rolls, etc. The frame of each segment is detachably mounted on a pedestal (not shown) for convenience in maintenance and adjustment.

A water supply system 19 is shown in dotted lines and an air supply system 20 is shown in solid lines. These systems are connected to the air-water nozzles installed within the segments 18a–18h so that the casting surface is cooled by the air-water mist ejected from the air-water nozzles.

Segments 18i–18q constitute the horizontal part of the casting machine, each having five or six upper and lower horizontal transport rolls detachably mounted on pedestals (not known). The horizontal transport rolls are cooled by air-water mist so that the steel casting which passes through the segments 18i–18q is not directly cooled by air-water mist but cooled indirectly by the horizontal transport rolls.

Figure 9:
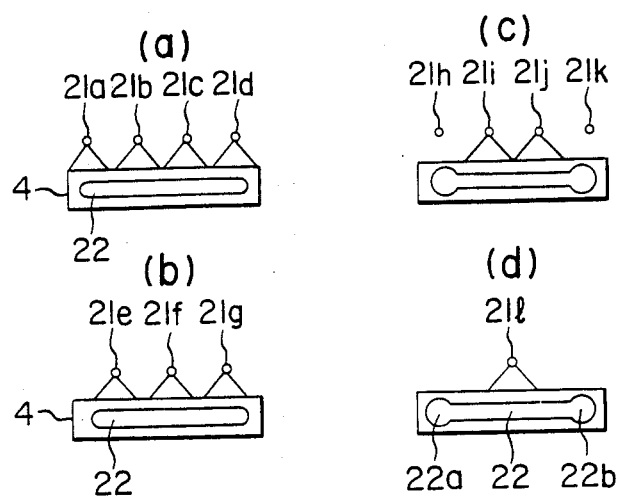
FIGS. 9(a)–9(d) are explanatory views showing the arrangement of air-water nozzles in the slow cooling system of this invention.

FIG. 9 is a schematic view taken cross-sectionally of a steel casting 4 and showing the arrangement of the air-water nozzles and the spray pattern of the sprays directed towards the steel casting 4. If it is required that the unsolidified core 22 of the casting 4 have the shape of a horizontally long rectangle, it is preferable that, for example, one set of four air-water nozzles 21a–21d be arranged at equal intervals in the width direction in the manner shown in FIG. 9(a) and the next set of air-water nozzles in the downstream direction be comprised of three nozzles 21e–21g arranged more toward the center. This pattern of nozzle sets with different numbers of nozzles, e.g. four nozzles and three nozzles alternately, is repeated. This arrangement is preferred since with the same number of nozzles, in all sets, the temperatures of the left and right edge portions of the continuous steel casting 4 are greatly reduced.

When it is particularly desired to maintain the temperature of the edge portions, this can be realized by alternately providing sets of two air-water nozzles 21i and 21j and one nozzle 21l as shown in FIGS. 9(c) and (d). In this case, the portions of the unsolidified core 22 near the edges of the casting are enlarged as shown at 22a and 22b. As a result, a steel casting 4 having a high temperature at both edges is obtained. With regard to the arrangement of the air-water nozzles, staggering the nozzles from upstream to downstream enhances the uniformity of the cooling effect.

In this specification, an arrangement of air-water nozzles whereby any portion of the casting can be selectively cooled as described above is referred to as a "slow cooling means capable of selective cooling". An embodiment of such an arrangement and its control mechanism is shown in FIG. 10.

Figure 10:
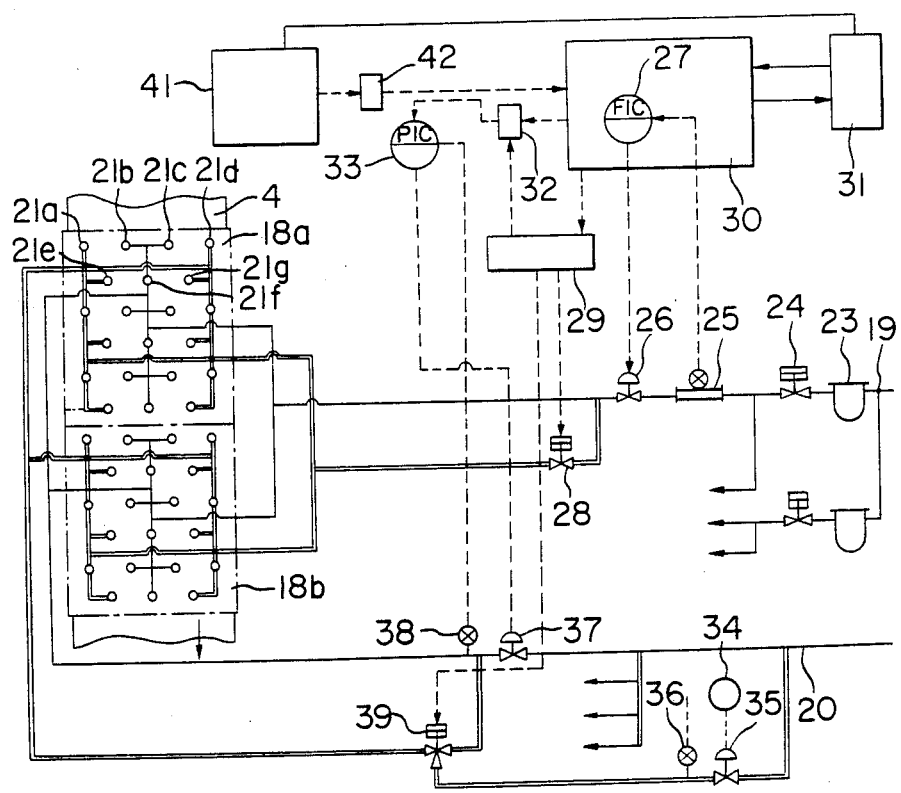
FIG. 10 is a block diagram of a control apparatus for controlling the spray from the air-water nozzles in the slow cooling system of this invention.

In FIG. 10, the continuous steel casting 4 is cooled by a slow cooling means consisting, for instance, of air-water nozzles 21a–21g while it passes through the segments 18a and 18b in the direction shown by an arrow. In this case, for the purpose of maintaining the casting temperature as required (more particularly, the specified average temperature of the casting and the temperature distribution in the width direction), such control operations as suspension of the spray from, for instance, air-water nozzles 21a, 21d, 21e and 21g are effected for a specified period of time.

FIG. 10 shows the water supply system 19, a strainer 23, a cut-off valve 24, an electromagnetic flowmeter 25, a control valve 26, a flow indication regulator 27, a cut-off valve 28, a sequence circuit 20, a cooling control arithmetic and command device 30, an overall process controller 31, a correction device 32, air supply 20, air pressure gauge-regulators 33, 34, a control valve 35, a pressure gauge 36, a control valve 37, a pressure gauge 38, a three-way valve 39, a casting width change controller 41, and a signal converter 42, etc.

A target temperature command for the continuous steel casting 4 is issued to the cooling control arithmetic and command device 30 by the overall process controller 31. In response, regulation is carried out by the control valves 26, 37 and the start (or stop) of spraying by the air-water nozzles is controlled by the three-way valve 39. Also, the sequence circuit 29, on the basis of a signal received from the casting width change controller 41, issues a command to the cut-off valve 28 and the three-way valve 39 so as to carry out the spraying operation and cooling control.

In this case, if required for controlling the casting temperature, air alone can be supplied to specific nozzles, for example to the nozzles opposite the edge portions of the casting.

The types of steel products which can be produced using the machine according to this invention include carbon aluminum-killed steels, medium carbon aluminum- or silicon-killed steels, high carbon steels, etc. By use category, the products include general construction steels, deep drawing or bending steels and a hot rolled black plate for producing tinplate or cold rolled sheet, etc. An example of the chemical composition of the steel is shown below, although it should be understood that the composition is by no means limited to this example.

C 0.02–0.05%
Si 0.005–0.35%
Mn 0.10–1.50%
P$<25\times10^{-3}$%
S$<25\times10^{-3}$%
total Al $5-100\times10^{-3}$%

Figure 11:
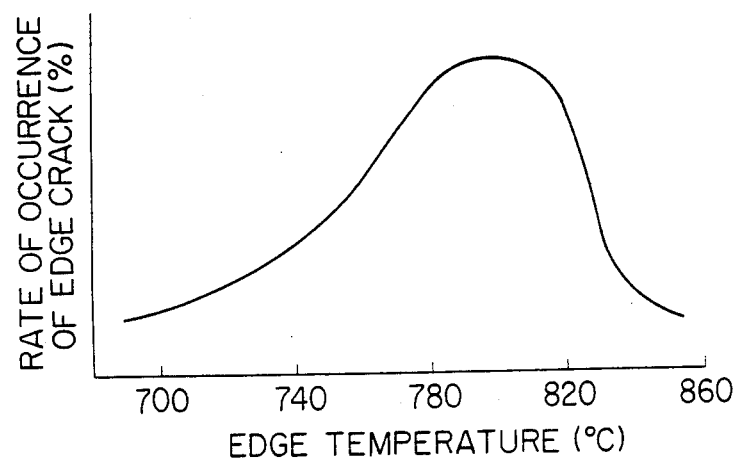
FIG. 11 is a graph showing the relationship between edge temperature and the occurrence of edge cracks.

The temperature requirements for the casting in this invention will now be described in more detail. The target temperature in the above-described slow cooling process is more than 900° C. at the surface of the casting. This temperature requirement is set to avoid the high temperature brittleness zone (750°–900° C.) wherein the occurrence of cracks is likely. Namely, it has been confirmed that in the hot continuous casting produced in a curved continuous casting machine, edge cracks tend to occur very frequently at temperatures below about 850° C. at the straightening or leveling point. This tendency is represented in FIG. 11.

The steel casting obtained from the conventional continuous casting process has several defects including surface cracks (longitudinal cracks, horizontal cracks and edge cracks) and internal cracks. One of the causes of longitudinal cracks is non-uniform cooling; one of the causes of horizontal cracks is excessive local cooling and straightening in the brittle zone; one of the causes of edge cracks is excessive cooling at the edges of the casting and straightening in the brittle zone; and one of the causes of internal cracks is the occurrence of excessive thermal stress due to the recuperation of surface heat.

In order to avoid the above defects, the following requirements should be satisfied: uniform cooling in the width direction of the casting; reduction of temperature fluctuation in cooling and heat recuperation; prevention of excessive cooling of the edge of the casting; capability of varying the cooling effect over a large range; and high stability in cooling (namely, no clogging of the nozzles).

The air-water mist cooling system meets the above requirements satisfactorily. The range over which cooling can be controlled in the direct water spray system is very narrow, and besides, the nozzles clog very frequently. Therefore, aside from its use in cooling at a point immediately below the continuous casting mold, the direct water spray system can not be used to attain the object of this invention.

The average temperature of the casting emerging from the segment 18q of FIG. 8 is preferred to be more than 1150° C. since there are a lot of steel grades in which the temperature of the steel at the outlet of the finish hot rolling stand is preferred to be more than the $Ar_3$ transformation. Therefore, a heat-retention means which closes the gaps between the transport rolls is installed over at least the segments 18a–18q, and further, the cutting means is equipped with a heat-retention cover which shrouds the casting front and rear so as to retain heat during the cutting operation by the cutting means.

In the hot rolling step, good quality of the miscellaneous grades and descriptions of steel products can be easily obtained if the temperature of the casting is more than 1000° C.–1100° C. prior to the rough rolling step.

However, this is not true where the two-phase zone rolling method is used to obtain a high tension steel, for instance. However, no matter what kind of steel, it is preferred that the temperature in the width direction as well as that in the length direction, be as uniform as possible. Thus, the machine according to this invention will meet the requirements therefor.

Another noteworthy feature of the present invention is that it does not use a surface conditioning means such as a hot scarfing means, which has hitherto been indispensable to the hot rolling method. As is well known, the hot scarfing operation grinds away the surface flaws of the steel casting. This operation is a principal cause of low yield and increases the amount of fuel required per ton of steel. In accordance with the machine of this invention, since a hot casting is obtained, the amount of scale formed is much greater than with known methods. As a result, surface flaws are inhibited. Therefore the surface skin of the casting can be given such a fine finish by a scale breaker only that hot scarfing is no longer required.

Figure 12:
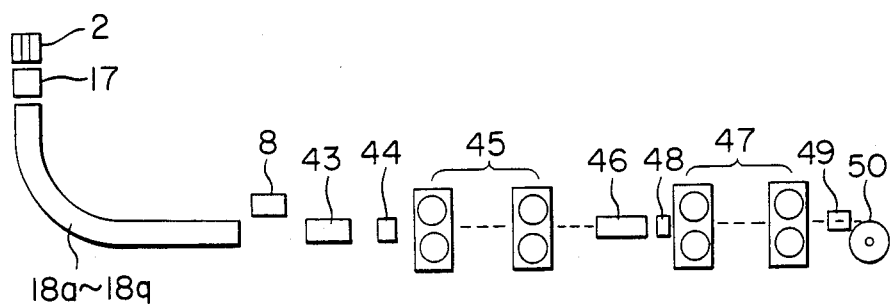
FIG. 12 is a block diagram schematically showing a system in accordance with an embodiment of this invention.

FIG. 12 is a schematic view showing an embodiment of the invention provided with a quick heating means 43 for heating the edge portions of the casting (e.g. an induction heating means), a scale breaker 44, a rough rolling machine 45, a finish rolling machine 47, and a gas or an induction heating means 46 installed (if required) at the inlet for heating the edge portions of the casting to be rolled, a scale breaker 48, a cooling means 49, and a coiler 50. Other components of the machine already described are not shown in detail.

The machine according to this embodiment has been successfully used on an industrial scale for the direct transport and direct rolling of a steel stock, particularly hot coil. The excellent energy-saving effect realized is evidenced by the fact that the consumption of thermal energy amounts to only $\frac{1}{2}-\frac{1}{8}$ of that of a conventional sequence of steps such as continuous casting—heating furnace—hot rolling (with intermediate cold rolling for example).

Three examples of the production of steel products using the machine of the invention will be described below.

EXAMPLE 1

A hot rolled sheet was produced from a medium carbon aluminum-killed steel.
Slab: 250 mm thick×1250 mm wide×7600 mm long
Coil: 3.2 mm thick×930 mm wide
Hot rolling
    rough rolling: Reduced from 250 mm to 60 mm
    finish rolling: Reduce from 60 mm to 3.2 mm
Temperature
    At the end of the machine (outlet of the segment 18q): 1200° C.
    Inlet of finish rolling: 1000° C.
    Outlet of finish rolling: 850° C.
Scale Breakers: 4 (Rough and Finish)
Flaws: Overall check: no crack, no sliver occurred

EXAMPLE 2

A hot rolled black plate to be used for production of cold rolled sheet was produced from a low carbon aluminum-killed steel.
Slab: 250 mm thick×950 mm wide×7500 mm long
Coil: 2.0 mm thick×920 mm wide
Hot Rolling
    rough rolling: Reduce from 250 mm to 60 mm
    finish rolling: Reduce from 60 mm to 2.0 mm
Temperature
    At the end of the machine: 1220° C.
    Inlet of finish rolling: 1020° C.
    Outlet of finish rolling: 880° C.
Scale Breakers: 4 (Rough and Finish)
Flaws: Overall check: no crack, no sliver occurred.

EXAMPLE 3

A hot rolled black plate to be used for production of tinplate was produced from a low carbon aluminum-killed steel.
Slab: 250 mm thick×890 mm wide×7300 mm long
Coil: 2.5 mm thick×870 mm wide
Hot Rolling
    rough rolling: Reduce from 250 mm to 60 mm
    finish rolling: Reduce from 60 mm to 2.5 mm
Temperature
    At the end of the machine: 1200° C.
    Inlet of finish rolling: 1000° C.
    Outlet of finish rolling: 870° C.
Scale Breakers: 4 (Rough and Finish)
Flaws: Overall check: no crack, no sliver occurred.

We claim:
1. An apparatus for continuously casting a casting in a casting machine and feeding it directly to a rolling means, said apparatus comprising:
a continuous casting machine having a curved part and a horizontal part;
a continuous casting mold at the upstream end of said curved part;

a gas cutting means at the outlet of said horizontal part for cutting the casting cast in the continuous casting machine;

a transport table at the output side of said cutting means for transporting a cut length of casting;

a heat retention means over said transport table and over said gas cutting means;

said curved part of said continuous casting machine having a water spray cooling means at the outlet of said continuous casting mold and slow cooling means along said curved part and directed against the casting for cooling said casting to form a desired shape of the unsolidified core, said slow cooling means having a plurality of sets of air-water nozzles with each set having a plurality of nozzles with the nozzles of each set spaced at intervals along the length of said curved part and each set having the respective nozzles in rows with corresponding nozzles in the other sets, the nozzles in the rows being spaced in the width direction of the steel casting from the nozzles of the other sets in the corresponding rows, the successive nozzles in each set along the length of said curve part being staggered from each other in the direction of said row, the nozzles within each set being connected to each other;

individual supplying means for supplying air and water, as air alone or as a mixture of air and water, connected to respective sets of said nozzles along the portions corresponding to the outside parts of the width of the casting for supplying amounts of air and water to the respective sets for selectively cooling the outside portions of the width of the casting and further individual supplying means for supplying amount of air and water connected to respective sets of nozzles along the portion corresponding to the central part of the width of the casting, both said supplying means including means for controlling the amounts of air and water for cooling the different portions of the width of the casting at different desired rates;

a plurality of horizontal transport rolls spaced at intervals along said horizontal part of said casting machine and having heat retention means in the gaps between said rolls for substantially closing said gaps, and a further plurality of air-water nozzles directed at said rolls from outside the casting machine for indirectly cooling the casting by means of said horizontal transport rolls; and further means for supplying air and water to said further plurality of air-water nozzles;

whereby the cooling of the casting can be controlled to retain sufficient heat therein to permit subsequent hot rolling directly from said cutting means and transport table.

2. An apparatus as claimed in claim 1 in which the nozzles are in rows extending in the width direction of the casting and every other row of nozzles has four air-water nozzles and the remaining rows of nozzles have three air-water nozzles therein laterally offset from the nozzles in the four-nozzle rows with the nozzles in the rows being aligned on lines in the direction of the length of the casting, nozzles in the same lines being connected to form the sets.

3. An apparatus as claimed in claim 1 in which said air-water nozzles of said slow cooling means are arranged in staggered relation to one another from the upstream to the downstream end of said curved part.

4. An apparatus as claimed in claim 1 in which said means for supplying air and water comprise a water supply system and an air supply system connected to said air-water nozzles, and means for controlling the supply of water and air to said nozzles for selectively supplying air alone or mixtures of water and air.

5. An apparatus as claimed in claim 1 further comprising a casting surface treating means downstream of said transport table and from which the casting is introduced directly into the rolling means, said casting surface treating means consisting of a scale-breaker.

6. An apparatus as claimed in claim 5 further comprising an edge heating means upstream of said scale-breaker.

* * * * *